United States Patent [19]

Scott

[11] Patent Number: 5,115,627
[45] Date of Patent: May 26, 1992

[54] LEG SUPPORT WRAP FOR HORSE

[76] Inventor: Dal Scott, 3617 Bancroft Dr. #B, Spring Valley, Calif. 92077

[21] Appl. No.: 615,315

[22] Filed: Nov. 12, 1990

[51] Int. Cl.⁵ .............................................. A61D 9/00
[52] U.S. Cl. ....................................... 54/82; 128/882
[58] Field of Search .............. 54/82; 119/143, 126, 119/96; 168/18; 128/80 R, 165, 882

[56] References Cited

U.S. PATENT DOCUMENTS

| 2,937,487 | 5/1960 | Dever | 54/82 |
| 4,099,269 | 7/1978 | Porner | 54/82 X |
| 4,538,602 | 9/1985 | Shapiro | 128/882 |

FOREIGN PATENT DOCUMENTS

| 8907915 | 9/1989 | PCT Int'l Appl. | 119/96 |
| 7714 | of 1899 | United Kingdom | 54/82 |

Primary Examiner—Robert P. Swiatek
Attorney, Agent, or Firm—Calif Tervo

[57] ABSTRACT

A wrap for a horse's lower leg includes a panel configured to wrap once around the leg from near the pastern to above the fetlock and to conform to the shape of the leg. The panel is comprised of an inner layer of shock dissipating material, such as Rubatex, and an outer layer of elastic shock absorbing material, such as neoprene. In a preferred embodiment, the inner layer is attached to the outer layer such that, upon wrapping, bulges created in the inner layer conform to the indentation between the tendon and bone to support them in their natural positions. An elastic support strap passes under the fetlock for additional support and is secured under the fetlock so that it will not move during movement of the leg.

16 Claims, 2 Drawing Sheets

LEG SUPPORT WRAP FOR HORSE

BACKGROUND OF THE INVENTION

1. Field of the Invention

This invention relates in general to an athletic leg support for a horse and more specifically involves a wrap for a horse's lower leg with improved protection, support and shock dissipation characteristics, particularly to the suspensory ligaments and the sesamoid bones 2. Background of the Invention Horses are highly susceptible to injury to the lower leg. Some injury results from external blows, such as by kicking. Athletic horses, particularly young race horses, often suffer injury to the tendon, fetlock, lower sesamoid bones, and suspensory ligament from the repeated hoof shock during running.

One particular problem is that the fetlock tends to drop as the lower suspensory ligaments fatigue, such as during a long ride such as a polo match or the like. This dropping of the fetlock exposes the sesamoid bones and suspensory ligaments in this crucial area to damage.

Another problem is the formation of wind puffs in the lower leg. Wind puffs are collections of fluid that can often be seen a bulges under the skin. Wind puffs interfere with healthy leg functions and detract from performance.

To help alleviate these problems, conventionally, an athletic wrap or boot is placed on the distal limb of athletic horses to provide protection from trauma. The boot acts as a shield to prevent kicking injury. Additionally, the boot may provide significant energy absorption as the fetlock is extended. The more energy the boot absorbs, the less impact energy is available for tissue deformation and injury.

Conventional boots comprise a band of elastic material that is wrapped around the lower leg. There are a number of disadvantages to the band wrap boot. The efficacy of such wraps are very operator dependent in that if the wrap is too tight or too loose the wrap is ineffectual or may even cause more problems or damage. Such wraps do not dissipate energy well to act as a shock deadener. Such wraps pull the tendon toward the bone and into an unnatural position and do not provide a good front support to the tendon. Such wraps tend to move during use of the leg. The wraps, being purely elastic tension members, only contact the outer high points of the leg and provide no pressure on tissue in indented areas. If the wrap becomes loose or unravels, it can cause injury to the horse and can even cause the horse to trip and fall, subjecting both horse and rider to serious injury.

Therefore, there is a need for an improved support for the lower leg of a horse.

SUMMARY OF THE INVENTION

According to the invention, a wrap for a horse's lower leg includes a panel configured to wrap once around the leg between the pastern to above the fetlock and to conform to the shape of the leg. The panel is comprised of an inner layer of shock dissipating material and an outer layer of elastic shock absorbing material.

In a preferred embodiment, the inner layer is attached to the outer layer such that, upon wrapping, bulges created in the inner layer conform to the indentation between the tendon and bone to support them in their natural positions. A particularly strong elastic securing strap passes under the fetlock for additional support and is secured under the fetlock so that it will not move during movement of the leg.

The energy absorption from concussion of the wrap greatly reduces the potential of trauma related and stress related injuries to the legs of the horse while providing three hundred sixty degrees of protection from impact.

The wrap provides superior support to the superficial and deep digital flexor tendons and suspensory ligaments along with outstanding protection to the sesamoid bones.

The wrap compresses the distal limb such such as to prevent the formation of wind puffs. If wind puffs are already present, application of the wrap of the present invention will cause them to dissipate.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
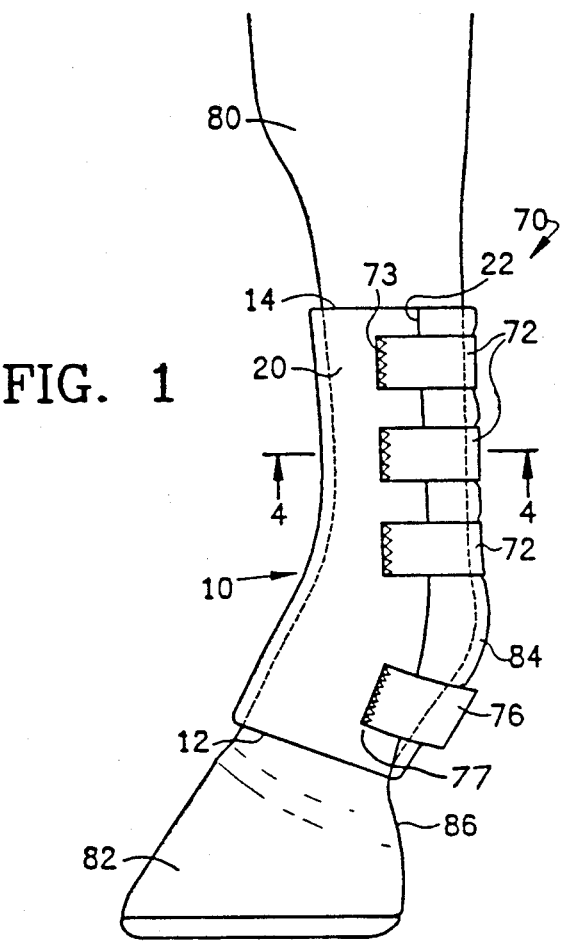
FIG. 1 is a side plane view of a preferred embodiment of the support wrap of the present invention as attached to the leg of a horse.

With reference now to the drawing and more particularly to FIG. 1 thereof, a preferred embodiment of the support wrap, denoted generally as 10, is shown in side view as attached to the lower portion of leg 80 of a horse. Shown as part of leg 80 is hoof 82, pastern 86, and fetlock 84.

Support wrap 10 generally comprises a panel, denoted generally as 20, that is wrapped around the leg 80. Panel 20 has a lower end 12 and upper end 14. Lower end 12 is disposed below fetlock 84 and near pastern 86. Upper end 14 disposed above the fetlock, preferably below any major muscle formation. Typically, this is about ten inches above the fetlock, depending on the size of the horse.

Figure 2:
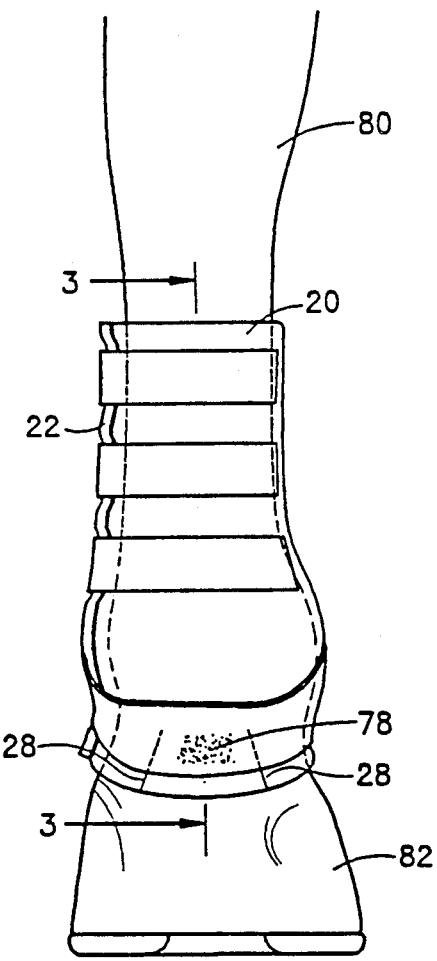
FIG. 2 is a rear view of the support wrap and leg of FIG. 1 particularly illustrating the strong elastic band passing under the fetlock.
Figure 4:
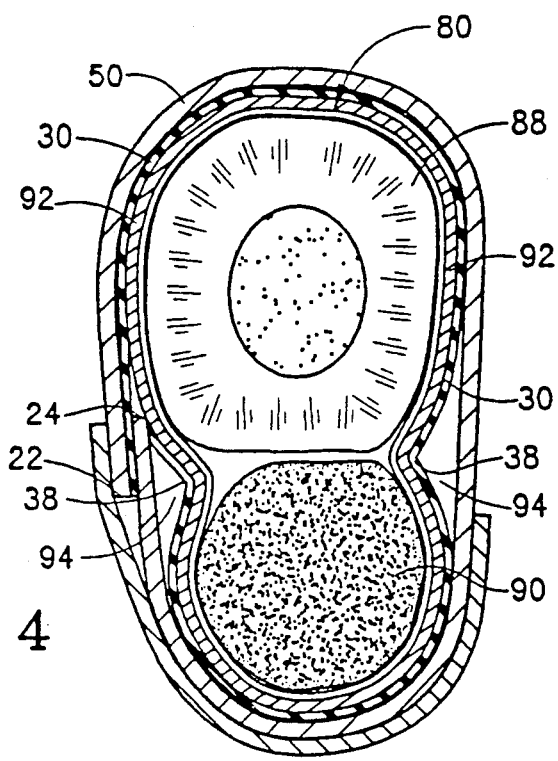
FIG. 4 is a view of the support wrap and horse's leg taken on line 4—4 of FIG. 1 particularly illustrating the support to the ligament.

Panel 20 is basically formed from a trapezoidal panel with lower end 12 being the long side. As best seen in FIG. 2, cut outs or darts 28 are made in panel lower end 12 to form a pocket for fitting snugly around and under fetlock 84. The length of panel 20 between inner end 24 (as seen in FIG. 4) and outer end 22 encompasses the leg 80. As seen in FIG. 4, panel 20 is wrapped typically with a slightly overlapping outer end 22.

After the panel 20 is in place it is snugly fastened to leg 80 with securing means 70, such as upper securing straps 72 and support strap 76. In the preferred embodiment, the outside surface of panel 20 is covered with knitted nylon material which acts as the loop side of a hook/loop fastener. Each securing strap 72 has a fixed end 73 attached to panel outer end 22. Strap 72 is constructed of strong material, such as nylon, with a backing (inside) of hook material for fastening to the outside of panel 20 throughout the length of the strap.

Support strap 76 passes under fetlock 84 and also provides added upward support to the suspensory ligaments. Support strap 76 is fixedly attached, such as by sewing, at first end 77 near panel outer end 22. Support strap 76 is constructed of strong elastic material, such as nylon coated neoprene. The strap outer end, i.e., the securing end, contains hook fastener material for securing the strap to the outside of panel 20. The rear (inside) of support strap 76 includes hold down means, such as a patch of hook fastener material 78 directly under fetlock 84 as seen in phantom in FIG. 2, for preventing lower strap 76 from moving upward during use. Support strap 76 provides considerable upward support for the lower suspensory ligaments and sesamoid bones of the lower fetlock 84.

FIG. 2 is a rear view of the support wrap 10 and leg 80 of FIG. 1. Cut outs 28 are depicted as stitch lines where panel material has been removed to make the panel 20 conform to the shape of the leg. Outer end 22 of panel 20 is seen with securing straps 72 attached to the inner wrap. Lower elastic strap 76 is shown with hold down hook material patch 78 on its inner side shown in phantom.

Figure 3:
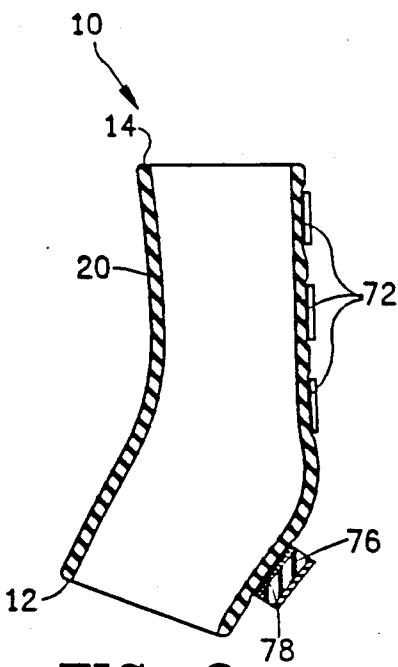
FIG. 3 is a side cross-sectional view of the support wrap taken on line 3—3 of FIG. 2.

FIG. 3 is a side cross-sectional view of the support wrap taken on line 3—3 of FIG. 2 with the leg 80 not shown and illustrating how wrap 10 conforms to the leg.

Figure 5:
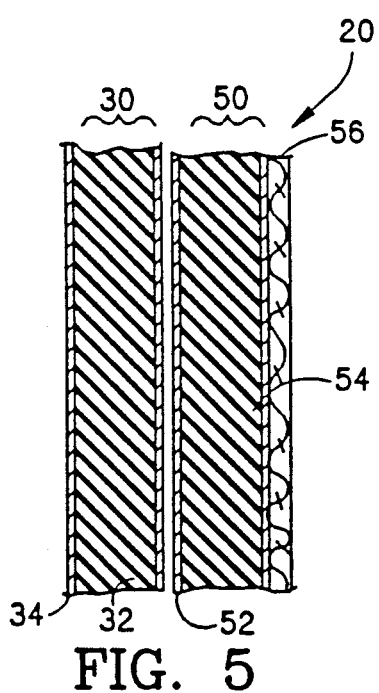
FIG. 5 is an enlarged sectional view of the panel portion of the support wrap.

FIG. 5 is an enlarged sectional view of a preferred embodiment of the panel portion 20 of support wrap 10. Panel 20 is comprised of two layers, inner layer 30 and outer layer 50. Inner layer 30, for disposition nearer the horse's leg, includes a sheet of shock dissipation material 32, such as a vinyl plastisol. A one-eighth inch thick sheet of material known by the trade name of Rubatex manufactured by Rubatex works well for this purpose. The white, ultra-shock Rubatex designated as K3-82 has been used with good results. This spongy but comparatively firm, small-celled closed-cell material dissipates localized shock while still providing firm support. A sheet of nylon 34 is bonded to the inner side of shock dissipating layer 32 for disposition directly adjacent the horse's leg. Nylon 34 protects shock dissipating layer 32 and presents a smoother surface to the leg to allow for minor slippage between the wrap and the leg upon attachment of the wrap and during use. This results in improved comfort and superior performance.

Panel outer layer 50 generally comprises a layer of elastic, shock absorbing material, such as neoprene 54. A neoprene sheet three-sixteenths inches thick has been found to work well. A nylon sheet 52 is bonded to the inner side of neoprene 54 and a cover of knitted nylon 56 is bonded to the outer side. The bonded nylon sheets provide additional strength and protection to for the neoprene. As more fully discussed above, knitted nylon outer layer 56 also acts as loop fastener material for securing straps 72. As shown in FIG. 5, basically, inner layer 30 is not bonded or otherwise attached to outer layer 50 except at their peripheries. The importance of this will be explained in reference to FIG. 4.

FIG. 4 is a cross-sectional view of support wrap 10 and horse's leg 80 taken on line 4—4 of FIG. 1. In cross-section, horse's lower leg 80 generally comprises cannon bone 88 disposed on the front side and tendon 90 on the back side. A skin and hair layer 92 covers leg 80. Both bone 88 and tendon 90 are essentially cylindrical shaped with nothing in between. Skin/hair layer 92 covers leg 80 such that there is an indentation 94 between bone 88 and tendon 90. It can be seen that a leg wrap that is elastic and that is wrapped tightly about leg 80 will leave a gap at indentation 94. Consequently, tendon 90 is not supported on its forward sides and, also, tendon 90 is pulled forward and impinges on bone 88, which can cause injury.

It has been found that if the two layers, inner layer 30 and outer layer 50, are attached while the panels are flat, such as by sewing, on their inner and outer ends, and not bonded to one another over their adjacent surfaces, then upon wrapping the wrap 10, inner layer 30 will have excess material. The excess material creates vertical bulges 38 that fill in indentations 94. It is believed that these vertical bulges 38 are beneficial in that they support tendon 90 on its front side and help prevent impingement of tendon 90 on bone 88. The wrap 10 made as described creates bulges 38. The bulges so created tend to be self-aligning with indentations 94. Other methods could be used to create vertical support bulges 38. For example, an elastic wrap could include vertical bulges on its inside surface for filling in indentations 94.

Although a particular embodiment of the invention has been illustrated and described, various changes may be made to the form, construction and arrangement of the parts herein without sacrificing any of its advantages. Therefore, it is to be understood that all matter herein is to be interpreted as illustrative and not in any limiting sense, and it is intended to cover in the appended claims such modifications and changes as come within the true spirit and scope of the invention.

I claim:

1. A support wrap for a horse's lower leg comprising:
   a panel for wrapping around a horse's lower leg including:
   a lower end for disposition near the pastern; and
   an upper end for disposition above the fetlock;
   said panel comprising:
   an inner layer for disposition adjacent the horse's leg comprising:
   a sheet of spongy, shock dissipating material;
   an outer layer attached to said inner layer and substantially congruent with said inner layer comprising:
   a sheet of strong, shock absorbing material, substantially more elastic than said inner layer;
   securing means for securing said panel to a horse's lower leg; and;
   elastic strap means attached to said panel for passing directly under the horse's fetlock for providing upward support to the underside of the fetlock;
   said elastic strap means further including:
   hold down means for securing said elastic strap means to said panel directly under the horse's fetlock such that said elastic band means cannot move up or down relative to the fetlock.

2. The support wrap of claim 1 wherein: said shock dissipating material is a closed cell foam.

3. The support wrap of claim 1 wherein: said shock dissipating material is a vinyl plastisol.

4. The support wrap of claim 1 wherein: said shock absorbing material is neoprene.

5. A support wrap for a horse's lower leg comprising:

an elastic panel for wrapping around a horse's lower leg including:
  a lower end for disposition near the pastern; and
  an upper end for disposition above the fetlock;
said panel having an inside surface for disposition adjacent the horse's leg including:
  vertical ridge means for disposition in the indentation between the leg bon and the tendon for supporting the front said of the tendon;
  securing means for securing said panel to the horse's leg; and
  elastic strap means attached to said elastic panel for passing directly under the horse's fetlock for providing upward support to the underside of the fetlock; said elastic strap means further including:
    hold down means for securing said elastic strap means to said panel directly under the horse's fetlock such that said elastic band means cannot move up or down relative to the fetlock.

6. The wrap of claim 5 wherein said panel comprises:
an inner layer for disposition adjacent the horse's leg comprising:
  a sheet of spongy, shock dissipating material;
an outer layer attached to said inner layer and substantially congruent with said inner layer comprising:
  a sheet of strong, shock absorbing material, substantially more elastic than said inner layer.

7. The support wrap of claim 6 wherein:
said shock dissipating material is a closed cell foam.

8. The support wrap of claim 6 wherein:
said shock dissipating material is a vinyl plastisol.

9. The support wrap of claim 6 wherein:
said shock dissipating material is Rubatex.

10. The support wrap of claim 9 wherein:
said Rubatex is white, ultrashock Rubatex.

11. The support wrap of claim 6 wherein:
said shock absorbing material is neoprene.

12. The support wrap of claim 6 wherein only the periphery of said inner layer is attached to said outer layer.

13. A support wrap for a horse's lower leg comprising:
an elastic panel for wrapping around a horse's lower leg including:
  a lower end for disposition near the pastern; and
  an upper end for disposition above the fetlock;
said panel comprising:
  an inner layer for disposition adjacent the horse's leg comprising:
    a sheet a spongy, shock dissipating material;
  an outer layer attached to said inner layer and substantially congruent with said inner layer comprising:
    a sheet of strong, shock absorbing material, substantially more elastic than said inner layer; said outer layer attached to said inner layer such that, upon wrapping said wrap around a horse's lower leg, said inner layer bulges inwardly to conform to the shape of the horse's leg;
  securing means for securing said panel to a horse's leg; and
elastic strap means attached to said elastic panel for passing directly under the horse's fetlock for providing upward support to the underside of the fetlock; said elastic strap further including:
  hold down means for securing said elastic strap means to said panel directly under the horse's fetlock such that said elastic band means cannot move up or down relative to the fetlock.

14. The support wrap of claim 13 wherein:
said shock dissipating material is a closed cell foam.

15. The support wrap of claim 13 wherein:
said shock dissipating material is a vinyl plastisol.

16. The support wrap of claim 13 wherein:
said shock dissipating material is Rubatex.

* * * * *